United States Patent
Johnson, Jr. et al.

(10) Patent No.: US 8,284,784 B2
(45) Date of Patent: Oct. 9, 2012

(54) GATEWAY APPLICATION TO SUPPORT USE OF A SINGLE INTERNET ADDRESS DOMAIN FOR ROUTING MESSAGES TO MULTIPLE MULTIMEDIA MESSAGE SERVICE CENTERS

(75) Inventors: Carle S. Johnson, Jr., Annapolis, MD (US); Mike Dewey, Arnold, MD (US); Nikhil Bhadange, Alexandria, VA (US)

(73) Assignee: TeleCommunication Systems, Inc., Annapolis, MD (US)

( * ) Notice: Subject to any disclaimer, the term of this patent is extended or adjusted under 35 U.S.C. 154(b) by 595 days.

(21) Appl. No.: 11/907,506

(22) Filed: Oct. 12, 2007

(65) Prior Publication Data

US 2008/0043763 A1 Feb. 21, 2008

Related U.S. Application Data

(63) Continuation of application No. 10/959,187, filed on Oct. 7, 2004.

(60) Provisional application No. 60/568,257, filed on May 6, 2004, provisional application No. 60/568,258, filed on May 6, 2004.

(51) Int. Cl.
*H04J 1/00* (2006.01)
(52) U.S. Cl. .................................. 370/400; 370/401
(58) Field of Classification Search .................. 370/396, 370/352, 270, 39, 401, 470, 2, 310, 398, 370/422, 400; 455/433, 466, 445, 456; 709/220–224
See application file for complete search history.

(56) References Cited

U.S. PATENT DOCUMENTS

| | | | |
|---|---|---|---|
| 3,400,222 A | 9/1968 | Nightingale | |
| 5,754,636 A | 5/1998 | Bayless | |
| 5,856,974 A * | 1/1999 | Gervais et al. | 370/392 |
| 5,941,945 A | 8/1999 | Aditham | |
| 5,959,543 A | 9/1999 | LaPorta | |
| 5,963,864 A | 10/1999 | O'Neil | |
| 6,023,470 A | 2/2000 | Lee | |
| 6,026,292 A | 2/2000 | Coppinger | |
| 6,081,508 A | 6/2000 | West | |
| 6,134,432 A | 10/2000 | Holmes et al. | |
| 6,138,158 A | 10/2000 | Boyle | |
| 6,208,870 B1 | 3/2001 | Lorello | |
| 6,219,669 B1 | 4/2001 | Haff | |
| 6,263,212 B1 | 7/2001 | Ross | |

(Continued)

FOREIGN PATENT DOCUMENTS

WO WO97/41654 11/1997

OTHER PUBLICATIONS

The Power of Mobile Unified Messaging: Siemans and Comverse to Demonstrate WAP-Based Messaging Applications on Live GPRS System, Comverse, Feb. 2000.

(Continued)

*Primary Examiner* — Brian D Nguyen
*Assistant Examiner* — Emmanuel Maglo
(74) *Attorney, Agent, or Firm* — William H. Bollman

(57) ABSTRACT

Wireless carrier networks can utilize multiple MMSCs all accessed by a message sender with a message addressed to a single Internet domain, providing a single point of entry for messages into the network of MMSCs and maintaining routing information sufficient to route messages to all subscribers via the MMSC.

6 Claims, 3 Drawing Sheets

U.S. PATENT DOCUMENTS

| | | |
|---|---|---|
| 6,289,095 B1 | 9/2001 | Buttitta |
| 6,370,242 B1 | 4/2002 | Speers |
| 6,424,841 B1 | 7/2002 | Gustafsson |
| 6,470,181 B1 | 10/2002 | Maxwell |
| 6,473,622 B1 | 10/2002 | Meuronen |
| 6,480,710 B1 | 11/2002 | Laybourn |
| 6,493,430 B2 | 12/2002 | Leuca |
| 6,560,456 B1 | 5/2003 | Lohtia et al. |
| 6,618,763 B1 | 9/2003 | Steinberg |
| 6,625,461 B1 | 9/2003 | Bertacchi |
| 6,658,260 B2 | 12/2003 | Knotts |
| 6,674,767 B1 | 1/2004 | Kadyk |
| 6,681,257 B1 | 1/2004 | Patel |
| 6,886,017 B1 | 4/2005 | Jackson et al. |
| 6,915,138 B2 | 7/2005 | Kraft |
| 6,987,969 B1 | 1/2006 | Bruing |
| 7,010,303 B2 | 3/2006 | Lewis |
| 7,058,036 B1 | 6/2006 | Yu et al. |
| 7,088,990 B1 | 8/2006 | Isomursu |
| 7,120,418 B2 | 10/2006 | Herajarvi |
| 7,154,901 B2 | 12/2006 | Chava |
| 7,171,190 B2 | 1/2007 | Ye |
| 7,181,538 B2 | 2/2007 | Tam |
| 7,224,696 B2* | 5/2007 | Bouleros et al. ............. 370/401 |
| 7,260,836 B2* | 8/2007 | Roskind et al. .................. 726/4 |
| 7,318,098 B2 | 1/2008 | Steinberg |
| RE40,243 E | 4/2008 | Leuca |
| 7,366,529 B2 | 4/2008 | Alanara |
| 7,409,428 B1 | 8/2008 | Brabec |
| 7,480,915 B2 | 1/2009 | Costa Requena |
| 7,486,641 B2* | 2/2009 | Reddy et al. .................. 370/331 |
| 7,509,136 B2 | 3/2009 | Hart |
| 7,519,654 B1 | 4/2009 | Smith |
| RE40,780 E | 6/2009 | Leuca |
| 7,577,431 B2* | 8/2009 | Jiang .......................... 455/432.1 |
| 7,590,225 B2 | 9/2009 | Sivula |
| 7,627,305 B2 | 12/2009 | Helferich |
| 7,761,511 B2 | 7/2010 | Kaplan |
| 7,809,382 B2 | 10/2010 | Smith |
| 7,860,068 B2 | 12/2010 | Smith |
| 7,890,127 B2 | 2/2011 | Knotts |
| 7,991,411 B2 | 8/2011 | Johnson |
| 2002/0143946 A1* | 10/2002 | Crosson ........................ 709/226 |
| 2003/0040300 A1 | 2/2003 | Bodic |
| 2003/0092454 A1 | 5/2003 | Halim |
| 2003/0105864 A1 | 6/2003 | Mulligan |
| 2003/0163730 A1* | 8/2003 | Roskind et al. ............... 713/201 |
| 2003/0193967 A1 | 10/2003 | Fenton |
| 2004/0196858 A1 | 10/2004 | Tsai |
| 2004/0203756 A1* | 10/2004 | Lin et al. ........................ 455/433 |
| 2005/0004968 A1* | 1/2005 | Mononen et al. ............. 709/200 |
| 2005/0064884 A1* | 3/2005 | Dumont et al. ............... 455/466 |
| 2005/0076084 A1 | 4/2005 | Loughmiller et al. |
| 2005/0132060 A1* | 6/2005 | Mo et al. ........................ 709/227 |
| 2005/0141522 A1* | 6/2005 | Kadar et al. ................... 370/396 |
| 2005/0164721 A1 | 7/2005 | Yeh |
| 2005/0176406 A1 | 8/2005 | Carpenter |
| 2005/0186974 A1 | 8/2005 | Cai |
| 2006/0053197 A1 | 3/2006 | Yoshimura et al. |
| 2006/0194595 A1* | 8/2006 | Myllynen et al. ............. 455/466 |
| 2010/0257241 A1 | 10/2010 | Hale |

OTHER PUBLICATIONS

ETSI/3Gpp, 3$^{rd}$ Generation Partnership Project; Technical Specification Group Services and System Aspects; General Packet Radio Service (GPRS); Service description; Stage 2; (3G TS 23.060 version 3.2.1), Jan. 2000, pp. 138-142.

ETSI,3GPP, 3$^{rd}$ Generation Partnership Project; Technical Specification Group Core Network; Customized Applications for Mobile network Enhanced Logic; (CAMEL) Phase 3—Stage 2 (3G TS 23.078 version 3.3.0), 12/199, pp. 300-329.

Bond, "Cellular Carriers Use Prepaid Programs to Reach Untapped Markets," Billing World, Mar. 1997, pp. 14-17.

Freedom Wireless, "The Freedom to Chose! Get Pre-Pay Cellular," sales pamphlet, undated.

MultiMedia Publishing Corp., "Prepaid Cellular and Prepaid Wireless Market Report and Forecast 1997-2002," sales literature, undated.

NEXTLINK, "Introducing a New Prepaid Telephone Service from NEXTLINK," sales literature, undated.

Open Development Corp., "openMedia Cellular Prepaid," sales literature, undated.

Tecore, Inc., "Pre-Paid Cellular," sales literature, Mar. 25, 1997, pp. 1-4.

International Search Report in PCT/US2005/15667 dated Oct. 20, 2008.

Newsletter "Sonera Bill Warning" Digital Cellular Report. Stevenage: Jun. 17, 1998. vol. 4, Iss.; p. 1.

"Technology Rides Control Network to Support Short Package Applications"; Advanced Intelligent Network New. Washington, DC: Mar. 19, 1997. vol. 7, Iss. 6; p. 1.

Cellular Mobile Pricing Structures and Trends; Dr. Sam Paltridge of the OECD's Directorate for Science, Technology and Industry; Dist.: May 19, 2000 (Nov. 1999).

* cited by examiner

GATEWAY APPLICATION TO SUPPORT USE OF A SINGLE INTERNET ADDRESS DOMAIN FOR ROUTING MESSAGES TO MULTIPLE MULTIMEDIA MESSAGE SERVICE CENTERS

This application is a continuation of U.S. Application Ser. No. 10/959,187, entitled "Gateway Application to Support Use of A Single Internet Address Domain for Routing Messages to Multiple Multimedia Message Service Centers" to Carle S. Johnson et al., filed on Oct. 7, 2004; which claims priority from U.S. Provisional Application No. 60/568,257, entitled "Method to Qualify Multimedia Message Context to Enable Use of a Single Internet Address Domain to Send Messages to Both Short Message Service Centers and Multimedia Message Service Centers" to Carle S. Johnson, et al., filed on May 6, 2004; and from U.S. Provisional Application No. 60/568,258, entitled "Gateway Application to Support Use of a Single Internet Address Domain for Routing Messages to Multiple Multimedia Service Centers" to Carle S. Johnson, Jr., et al., filed on May 6, 2004, the entirety of all of which are expressly incorporated herein by reference.

BACKGROUND OF THE INVENTION

1. Field of the Invention

This invention relates to wireless telecommunications, and in particular to multimedia messaging services (MMS).

2. Background of Related Art

The world has been transformed by the emergence of electronic messaging. Initially, short messaging services (SMS) were developed to allow text messaging. Later, these text capabilities were expanded to include audio and images with multimedia messaging services (MMS).

To send an MMS message, an MMS message file must first be created. The format of an MMS message file is documented in the MMS Encapsulation Protocol specification published by the Open Mobile Association (www.openmobileassociation.org) and/or the WAP Forum (www.wapforum.org). The MMS message file format consists of an MMS message binary header, followed by a multipart MIME message where the multipart message is encoded in a binary multipart format as defined by the WAP Wireless Session Protocol (WSP) specification. This binary MMS message file is stored on a web server using a MIME type of application/vnd.wap.mms-message and an MMS message type of m-retrieve-conf. A subset of the binary MMS header is sent as an MMS notification message (MMS message type m-notification-ind) via SMS to the mobile device together with a URL pointer to the location of the complete message.

MMS (Multimedia Messaging Service) messages are sent using a combination of SMS and Wireless Application Protocol (WAP) technologies. Conventionally, when an MMS message is sent, a mobile device 800 receives an MMS notification message via SMS. When this MMS notification message is received by the mobile device 800, the mobile device 800 either automatically or at user request initiates a WAP gateway connection to download the content of the MMS message.

Messages are delivered from an MMSC to a handset via an MM1 interface, which is normally implemented over a WAP gateway, but may also be delivered via some other proprietary direct IP air interface. MM4 is strictly defined as MMSC to MMSC communication. MM7 is the Value Added Service Provider interface to the MMSC. It is defined as an XML/SOAP API. MM4 and MM7 are not used to communicate to handset devices. MM4 is the MMS standard for connectivity between multiple MMSCs. MM4 is an SMTP based interface where the MMS message is posted to the server as a standard MIME encoded e-mail message. MM1 is the MMS standard for phones to send and receive MMS messages from an MMSC. For information relating to components of the MMS standard, reference should be made to 3 Gpp TS 23.140 v6.5.0 Technical Specification—$3^{rd}$ Generation Partnership Project; Technical Specification Group Terminals; Multimedia Messaging Service (MMS); Functional description; Stage 2 (Release 6).

Moreover, wireless Service Providers (carriers) currently install a single Multimedia Messaging Service Center (MMSC) to support all of their multimedia messaging subscribers. The number of subscribers that the single MMSC can support is limited. In order to support more than one MMSC in the carrier's network, each MMSC must have a unique Internet address. Internet messages must be sent to the explicit mailbox and Internet domain name for a particular MMSC. Thus, multiple MMSCs serving the same network must each be referenced by unique address@domains. This forces the carrier to either rely on a single MMSC, or to publish a different domain for each MMSC deployed. This results in uncertainty for message senders as to which domain messages to any particular subscriber within the network should be addressed.

Carriers providing Multimedia Messaging Services utilize a single MMSC to serve all subscribers in their network OR they require messages to be addressed to the specific domain name of the MMSC hosting the subscriber, resulting in the use of multiple domain names for Multimedia Messaging within a single carrier network.

FIG. 3 depicts the conventional installation of an MMSC and an SMSC in a wireless provider's network.

There are disadvantages with the current technology. For instance, wireless service providers cannot publish a single domain name that can be used to address all of the carriers subscribers. Moreover, wireless service providers are forced to either rely on a single MMSC, or to publish a different domain for each MMSC deployed. Nationwide wireless service providers cannot employ multiple MMSCs to service geographically diverse population centers or to provide geographic redundancy for fault tolerance. Wireless service providers cannot easily integrate Multimedia Message Centers from multiple vendors. Any processing that the carrier wants to apply to Multimedia Messages must be applied at each MMSC. Also, there is no single point of connection for third party service providers to connect to send messages to all subscribers within the carrier's network.

There is a need for techniques and architecture for MMS services which are simpler to implement from a sender's perspective, and which ensure maximum profitability from a carrier's perspective.

SUMMARY OF THE INVENTION

In accordance with the principles of the present invention, a Multimedia Messaging (MMS) gateway comprises MM3 (SMTP), MM4 (MMS Extended SMTP) and MM7 (SOAP) interfaces for connection to an Internet. A plurality of MM3, MM4 and MM7 interfaces connect to a plurality of network Multimedia Messaging Service Centers (MMSCs). A database associates subscribers with a particular MMSC servicing them. A routing module forwards incoming MMS messages to a particular one of a plurality of MMSCs based on information obtained from the database. In this way, messages are sent to subscribers of a plurality of MMSCs using addresses to a single domain name associated with the MMS gateway.

A method of providing a single domain name for Multimedia Messaging (MMS) messages addressed to multiple Multimedia Messaging Service Centers (MMSCs) in a wireless network in accordance with another aspect of the present invention comprises receiving an MMS message through a connection to an Internet intended for a subscriber of one of a plurality of MMSCs. A destination subscriber is associated with a particular one of the plurality of MMSCs servicing them. The received MMS message is forwarded to the particular one of the plurality of MMSCs based on an association of the destination subscriber with the particular one of the plurality of MMSCs. In this way, MMS messages are sent to subscribers of a plurality of MMSCs using addresses to a single domain name.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Benefits of the present invention include the fact that the Multimedia Messaging intelligent gateway 100 provides a single point to apply carrier initiated control processing such as anti-"spam" (unsolicited email) checks and subscriber or carrier defined message manipulation or message blocking by sender address for all messages entering the network. Also, the Multimedia Messaging intelligent gateway 100 provides a store-and-forward capability that prevents message loss in the event that an MMSC is momentarily out of service. Moreover, the message storage facility of the Multimedia Messaging intelligent gateway 100 can be utilized as a central inbox to facilitate Web reporting or to consolidate and accumulate overall network messaging statistics. The present invention also allows for the integration of MMSCs from multiple vendors into a carrier's network.

Another benefit of the present invention is that it allows wireless carrier networks to provide Multimedia Messaging utilizing multiple Multimedia Messaging Service Centers, allowing messages for subscribers of each of the multiple MMSCs to be sent addressed to but a single Internet domain.

In the embodiment of the present invention, the disclosed wireless MMS Gateway (MMSG) Application provides a gateway with a single domain name which connects all MMSCs in a provider's network, provides a single point of entry for messages into the network of MMSCs and maintains routing information sufficient to route messages to all subscribers via the appropriate MMSC.

Exemplary components of the disclosed Multimedia Messaging Service Gateway are:

An MM3 (SMTP), MM4 (MMS Extended SMTP) and MM7 (SOAP) Servers for inbound email

A database containing subscriber tables, routing tables and message storage tables A message routing engine MM3 (SMTP), MM4 (MMS Extended SMTP) and MM7 (SOAP) client modules An optional message input interface to provide a connection mechanism for third party applications.

The Multimedia Messaging Service Gateway (MMSG) is installed in the carrier's network as the primary mail server for wireless MMS messages. All MMS messages for all subscribers handled by all MMSCs in the network are addressed to the subscriber's phone number (the mailbox) at the domain name assigned to the MMSG. (e.g. 4105551212@mmsg.com) The MMSG stores the multimedia message in its Message table to provide store-and-forward support. The MMSG then queries its subscriber and routing tables to determine the proper destination MMSC for the destination subscriber. The MMSG routing engine determines the route based on its routing tables and directs the message to the appropriate output module for delivery to the appropriate Multimedia Messaging Service Center.

Figure 1:
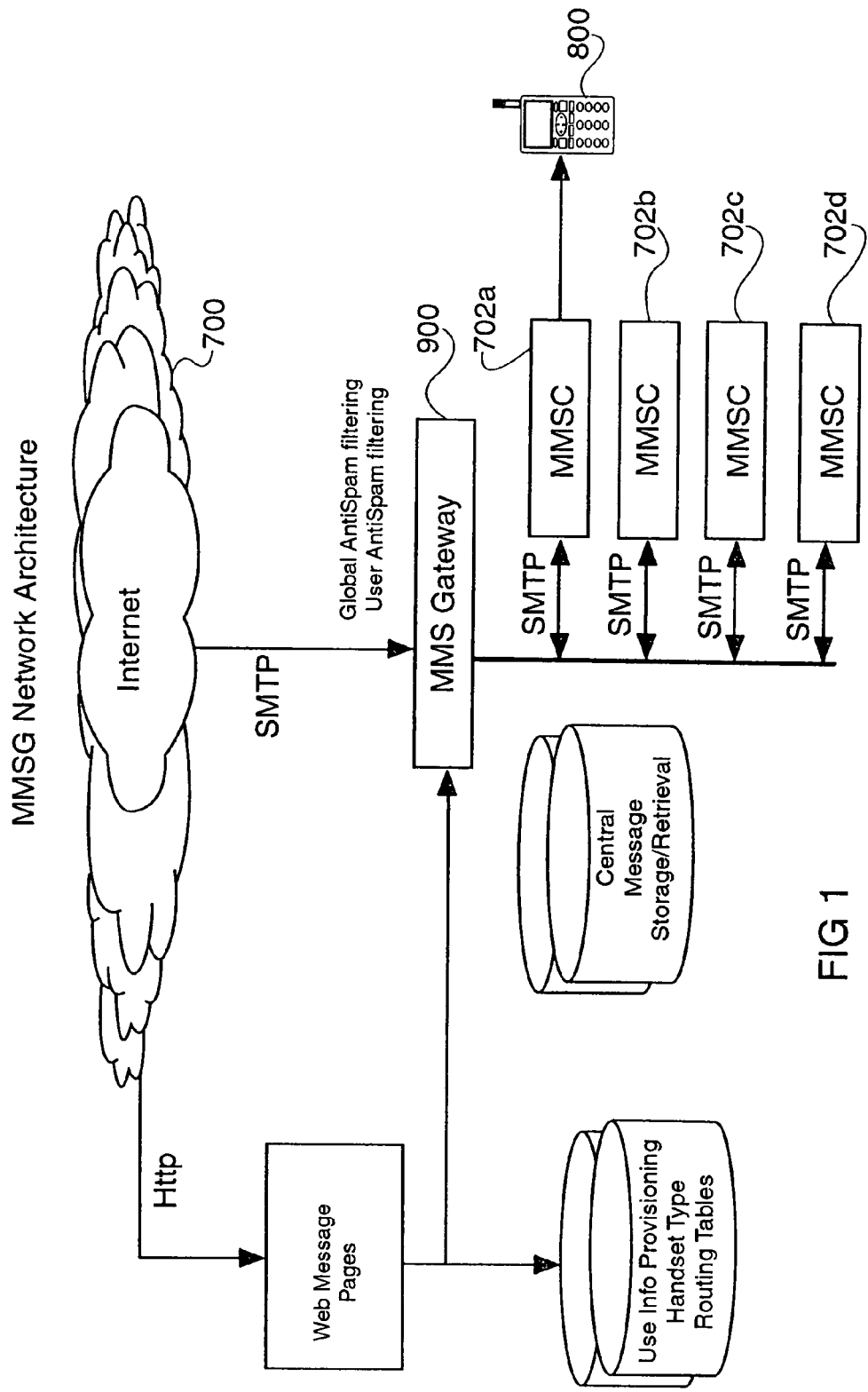
FIG. 1 shows an exemplary MMSG network architecture implementing multiple MMSCs accessed via a single domain name using a multiple MMS gateway, in accordance with another embodiment.

FIG. 1 shows an exemplary MMSG network architecture implementing multiple MMSCs accessed via a single domain name using a multiple MMS gateway, in accordance with another embodiment.

In particular, as shown in FIG. 1, an MMS gateway 900 accepts MMS messages intended for subscribers for any of the carrier's MMSCs 702a-702a. The MMS gateway 900 allows a single addressable point of presence on the Internet (single URL) for subscribers of multiple MMSCs 702a-702a.

Figure 2:
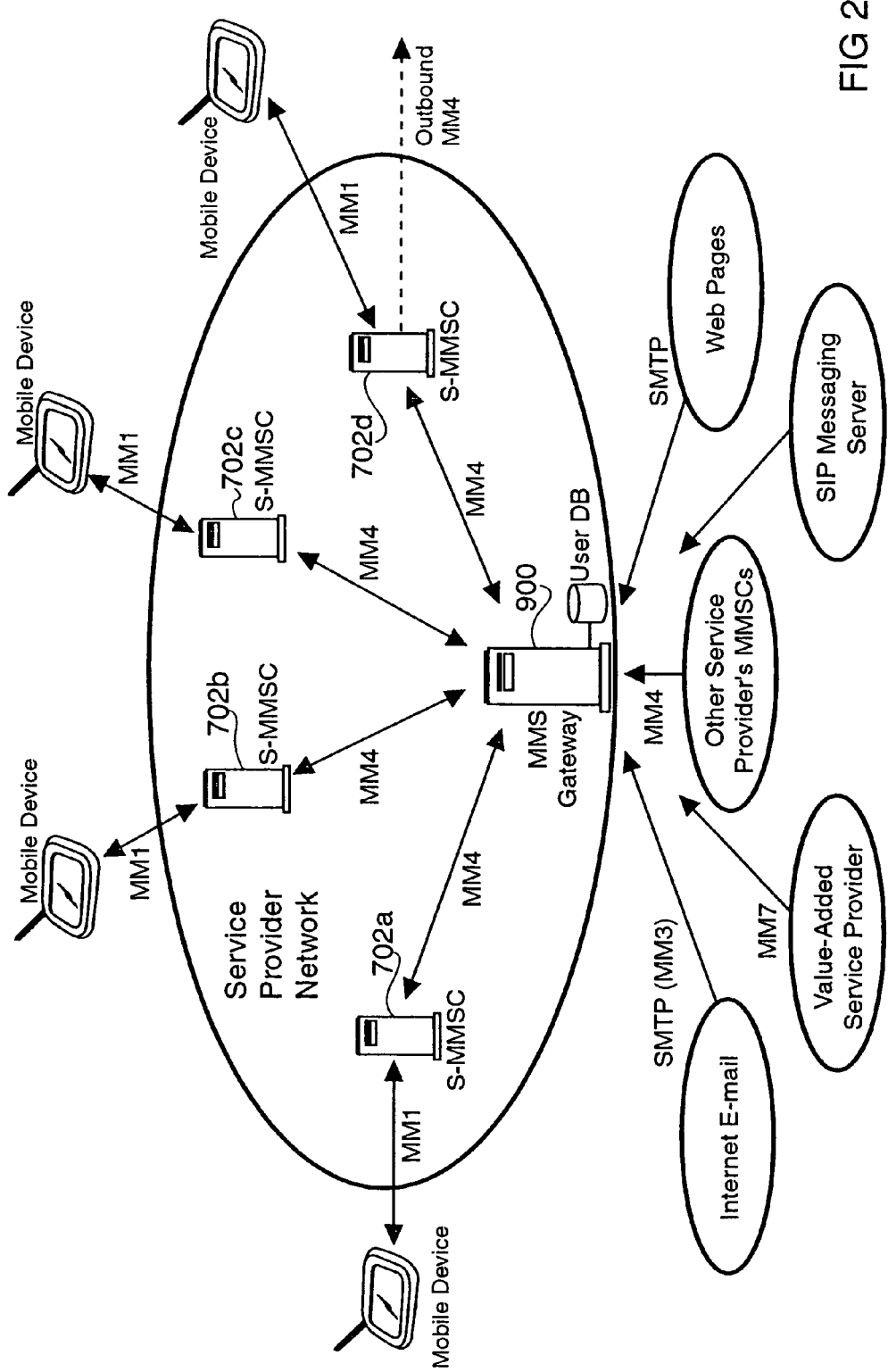
FIG. 2 shows a wireless carrier implementing four MMSCs accessed via a single domain name assigned to a multiple MMS Gateway, in accordance with the embodiment of FIG. 1.
Figure 3:
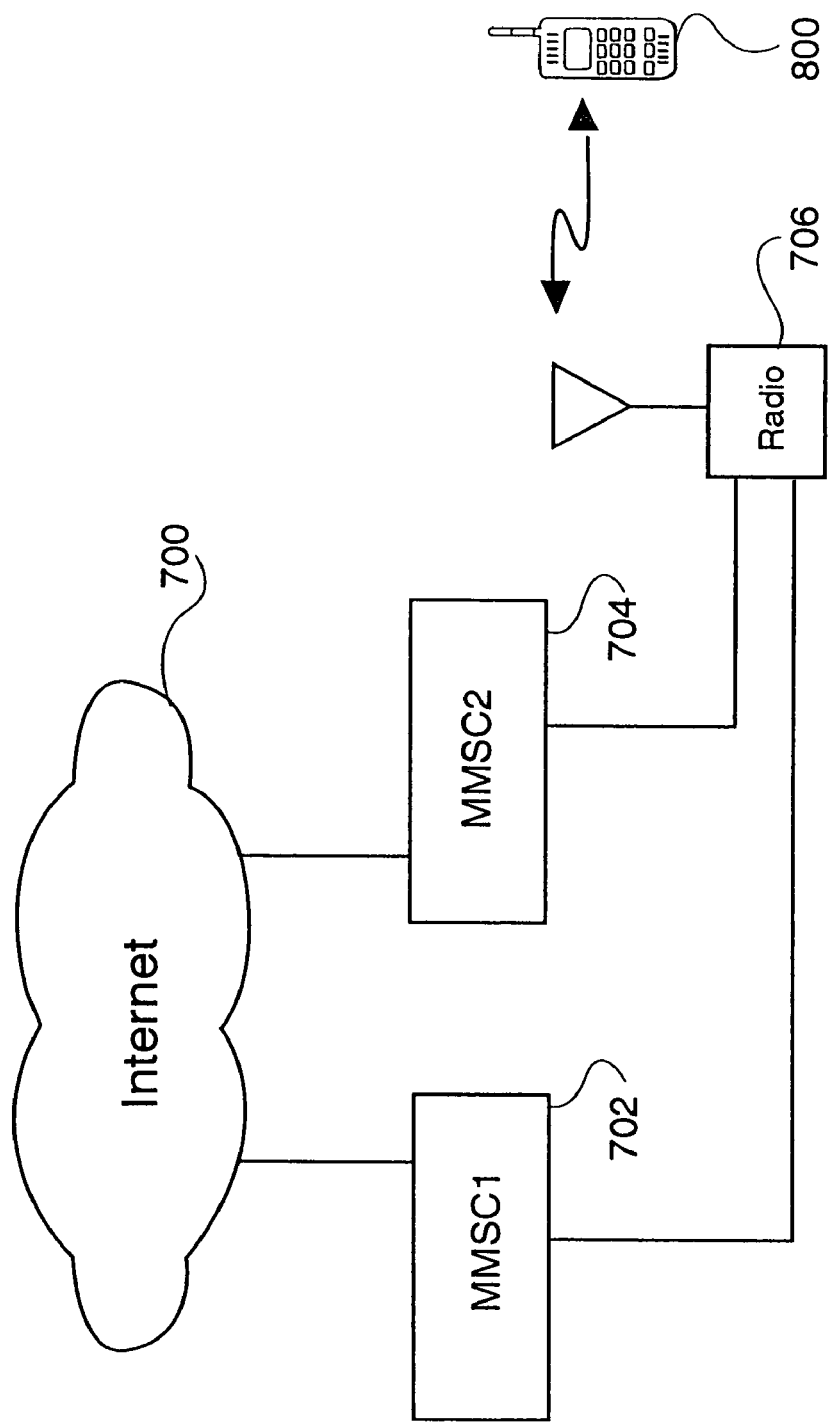
FIG. 3 depicts the conventional installation of an MMSC and an SMSC in a wireless provider's network.

FIG. 2 shows a wireless carrier implementing four MMSCs accessed via a single domain name assigned to a multiple MMS Gateway, in accordance with the embodiment of FIG. 1.

In particular, as shown in FIG. 2, multiple MMSCs 702a-702a are accessed via a single MMS Gateway 900, as also shown in FIG. 1.

The disclosed Multimedia Messaging Gateway 900 provides a single input connection point for Web based "Send an MMS message" pages.

The Multimedia Messaging Gateway 900 also provides a single input connection point for value added third party service providers.

The Multimedia Messaging Gateway 900 also provides a single point to apply carrier-initiated control processing such as anti-"spam" (unsolicited email) checks and subscriber or carrier defined message manipulation or message blocking by sender address for all messages entering the network.

The Multimedia Messaging Gateway 900 also provides a store-and-forward capability that prevents message loss in the event that an MMSC is momentarily out of service.

The message storage facility of the Multimedia Messaging Gateway 900 can be utilized as a central inbox to facilitate Web reporting or to consolidate and accumulate overall network messaging statistics.

The MMS gateway 900 has the inherent capability of integrating MMSCs 702a-702a from multiple vendors. An MMS gateway 900 in accordance with the principles of the present invention also allows a carrier to customize message content and delivery rules on an individual MMSC basis.

The present invention has applicability with all national and international wireless cell phone service providers and/or carriers offering or planning to offer Multimedia Messaging Services. For instance, the invention has particular applicability in replacing stand alone Multimedia Messaging Service Centers.

The envisioned market for the present invention includes all national and international wireless cell phone service providers and/or carriers offering or planning to offer Multimedia Messaging Services (MMS) in conjunction with Short Message Service (SMS).

While the invention has been described with reference to the exemplary embodiments thereof, those skilled in the art will be able to make various modifications to the described embodiments of the invention without departing from the true spirit and scope of the invention.

What is claimed is:

1. A method of communicating a message to a plurality of multimedia messaging service (MMS) centers (MMSC), comprising:
    providing a distribution MMS gateway (MMSG), assigned to a single unique distribution domain name address, to provide a single point of entry for messages communicated with said plurality of MMSCs, to provide a single distribution source for forwarding incoming MMS messages to said plurality of MMSCs, and to provide a single point to block a particular message from said messages communicated with said plurality of MMSCs based on a sender address; and
    hiding a status of said plurality of MMSCs from an MMS transmitting device.

2. The method of communicating a message to a plurality of multimedia messaging service (MMS) centers (MMSC) according to claim 1, further comprising:
    checking for spam within said distribution MMSG.

3. The method of communicating a message to a plurality of multimedia messaging service (MMS) centers (MMSC) according to claim 1, further comprising:
    blocking messages within said distribution MMSG.

4. The method of communicating a message to a plurality of multimedia messaging service (MMS) centers (MMSC) according to claim 1, further comprising:
    providing for at least one of an MM3(SMTP), MM4(MMS Extended SMTP) and MM7 (SOAP) servers for inbound email.

5. The method of communicating a message to a plurality of multimedia messaging service (MMS) centers (MMSC) according to claim 1, further comprising:
    providing for at least one of MM3(SMTP), MM4(MMS Extended SMTP) and MM7 (SOAP) client modules.

6. The method of communicating a message to a plurality of multimedia messaging service (MMS) centers (MMSC) according to claim 1, further comprising:
    providing a connection mechanism for third party applications to said distribution MMSG.

* * * * *